United States Patent [19]
Park et al.

[11] Patent Number: 5,405,490
[45] Date of Patent: Apr. 11, 1995

[54] FLAT DISPLAY DEVICE AND METHOD FOR MANUFACTURING THE SAME

[75] Inventors: Gyeong-Lyong Park; Sin-Chong Park; Dong-Goo Kim; Hyung-Jin Yoon; Chul-Soon Park; Min-Kyu Song, all of Daejeon, Rep. of Korea

[73] Assignee: Electronics and Telecommunications Research Institute, Rep. of Korea

[21] Appl. No.: 149,114

[22] Filed: Nov. 9, 1993

[30] Foreign Application Priority Data

Nov. 10, 1992 [KR] Rep. of Korea ............... 92-20983

[51] Int. Cl.⁶ .................. H01L 21/306; B44C 1/22; C03C 15/00; C23F 1/00
[52] U.S. Cl. .................. 156/643; 156/650; 156/656; 156/657; 156/659.1; 156/667; 345/87; 345/100; 437/181
[58] Field of Search ............... 156/630, 643, 644, 650, 156/656, 657, 659.1, 662, 664, 665, 667; 345/87, 88.92, 100, 94, 109; 437/181, 927; 359/87

[56] References Cited

U.S. PATENT DOCUMENTS

| | | | |
|---|---|---|---|
| 5,032,536 | 7/1991 | Oritsuki et al. | 437/181 |
| 5,266,531 | 11/1993 | Kikinis | 156/644 X |
| 5,302,235 | 4/1994 | DiSanto et al. | 156/643 |

*Primary Examiner*—William Powell
*Attorney, Agent, or Firm*—Larson and Taylor

[57] ABSTRACT

A flat display device has a plurality of pixels and a plurality of micro light valves which correspond to each of the pixels thereof, and has a plurality of selection lines and data lines disposed in a matrix the micro light valves each comprise a data electrode to be connected with each of the data lines through a via, a selection electrode to be connected with each of the selection lines, a common electrode formed between the selection and data electrodes, a frame, and a shifting element capable of being moved in the frame by driving signals to be applied to the data and selection electrodes, so as to pass or shut off a light beam. A first driving means is connected to the respective selection lines, for supplying a predetermined selection signal for said light valves; and a second driving means is connected to the respective data lines, for supplying a predetermined data signal for said light valve.

17 Claims, 13 Drawing Sheets

FLAT DISPLAY DEVICE AND METHOD FOR MANUFACTURING THE SAME

BACKGROUND OF THE INVENTION

1. Field of the Invention

The present invention relates to a flat display device, and more particularly to a flat display device with a plurality of micro light valves which are corresponding to respective pixels for display, in which each of the micro light valves is controlled by use of electrostatic force to pass or shut a light beam, thereby displaying stationary and moving images, and a method for manufacturing the same.

2. Description of the Prior Art

In various types of light valves for passing or shutting a light beam, there is a liquid crystal display (referred to as "LCD", hereinafter) device using a liquid crystal, as typical light valve. Since such an LCD device is low in power consumption required for passing or shutting of a light beam through liquid crystal therein and is capable of driving a plurality of image pixels independently, the LCD device has been widely used in the display field.

The LCD device, as is widely used as a flat display device, can be operated by low voltage and fabricated with thin film, as compared with a conventional CRT (cathode ray tube) display. Particularly, a thin film transistor LCD device is one of the widely-used flat display devices, because it is capable of embodying a high image quality with respect to various colors.

However, when an LCD device is fabricated by up-to-date techniques, several problems which occur are as follows:

1. It is difficult to design pixel arrangement for display or to manufacture pixels in proportion to increase of the pixels.

2. As is the case with TFT (Thin Film Transistor) liquid crystal display device having a large panel, it is difficult to manufacture such a display device having a large panel. As a result, the larger the display panel is, the lower the yield of the display device.

3. Since the conventional display device, such as an LCD device, uses liquid crystal material as an intermediation for shutting and passing a light beam, it is difficult to utilize several complicated-processes, such as injection of liquid crystal materials, adjustment of space between two opposite substrates having a liquid crystal layer therebetween, forming process of orientation films for arrangement of liquid crystal, or the like. Also, for this reason, the cost of the display is very expensive.

4. The viewing angle of the LCD is lower than that of CRT.

5. Since a polarization plate has to be provided in an LCD, the large amount of light is lost.

On the other hand, in the case of mechanical light valves which have been developed recently, there is more power consumption, and it is difficult to manufacture a micro light valve or to make its operation fast. However, with the progress of semiconductor fabrication techniques, micro actuators capable of operating mechanically can be manufactured. Accordingly, if the size of such a mechanical light valve can be manufactured extremely small by semiconductor fabrication techniques, the mechanical light valve permits to pass and to shut a light beam fast by using a quite few energy.

One pixel of the LCD device is approximately 100 $\mu m \times 100$ $\mu m$ in size, but in the case that each pixel has less than the size, the further small pixel may be sensitively operated by electrostatic force caused by low voltage, as compared to gravity acting upon a body in motion. Therefore, if problems due to a frictional force between two faced bodies in motion can be overcome, each pixel having size of less than 100 $\mu m \times 100$ $\mu m$ can be sensitively operated fast by high electrostatic force. This operation has been experimented several times in an electrostatic motor having micron meters of several tens in size.

SUMMARY OF THE INVENTION

It is an object of the present invention to provide a flat display device in which a moving image or a stationary image can be displayed using a plurality of light valves as manufactured by semiconductor fabrication techniques, so as to overcome the above mentioned problems caused by LCD device.

It is another object of the present invention to provide a method for manufacturing a flat display device in which a moving image or a stationary image can be displayed using a plurality of light valves as manufactured by semiconductor fabrication techniques, so as to overcome the above mentioned problems caused by LCD device.

To achieve the objects of the present invention, a flat display device according to one aspect of the present invention comprises a plurality of micro light valves manufactured by a surface micro-machining technique, each of said micro light valves having a flat-shaped micro shifting element capable of moving in a linear direction, three electrodes for receiving driving signals for driving the shifting element, insulating layers formed respectively between the shifting element and each of the electrodes, a guiding means for guiding the shifting element, and a frame for serving as a black matrix, and further comprises signal generating means for generating the driving signals having three phases, so that the driving signals are provided to the three electrodes for driving the shifting element.

According to other aspect of the present invention, the flat display device having a plurality of micro light valves which correspond to respective pixels for display, comprises a plurality of selection lines and data lines disposed in matrix; said micro light valves each comprising a data electrode to be connected with each of the data lines through a via, a selection electrode to be connected with each of the selection lines, a common electrode formed between the selection and data electrodes, a frame, and a shifting element for moving in the frame by driving signals to be applied to the data and selection electrodes, so as to pass or shut off a light beam; a first driving means connected to the respective selection lines, for supplying a predetermined selection signal for said light valves; and a second driving means connected to the respective data lines, for supplying a predetermined data signal for said light valve.

The method for manufacturing the flat display device comprises the steps of preparing a semiconductor substrate with a main surface; forming a transparent a data electrodes to be used as a data electrode, a selection electrode, and a common electrode on said substrate in parallel; depositing an insulating layer on said substrate formed thus; forming a first sacrificial layer on said insulating layer; forming a patterned shifting element layer on said first sacrificial layer; forming a second sacrificial layer on said substrate which is provided with said shifting element layer, and removing a portion of said laminated sacrificial layers by etching to form a frame contact portion; forming a patterned frame layer on the frame contact portion and a portion of said second sacrificial layer; and removing said remaining sacrificial layers to form a frame and a shifting element capable of moving in said frame by electrostatic force applied externally.

In the method, said substrate is made of glass, said transparent is made of an ITO film, and each of said selection and common electrodes is made of chromium.

Also, the step for forming said electrodes comprises the steps of forming said transparent layer on said substrate; and forming a patterned chromium layer on said substrate to form the selection and common electrodes in parallel. The step for forming said insulating layer is performed by depositing of nitride silicon twice.

Further, each of said sacrificial layers is made of aluminum, and said shifting element layer is formed of a nitride silicon layer and an amorphous silicon layer which are laminated with a predetermined pattern.

In addition, said frame layer is formed of a nitride silicon layer and an amorphous silicon layer which are laminated with a predetermined pattern.

According to further aspect of the present invention, the method for manufacturing the flat display device comprises the steps of preparing a semiconductor substrate with a main surface; forming a transparent a data electrodes to be used as with electrode, a selection electrode, and a common electrode on said substrate in parallel; depositing a first insulating layer on said substrate formed thus, and forming a via hole only on said transparent layer; forming a chromium layer on said first insulating layer and said via hole, and depositing a second insulating layer on said chromium layer; forming a first sacrificial layer on said second insulating layer; forming a patterned shifting element layer on said first sacrificial layer; forming a second sacrificial layer on said substrate which is provided with said shifting element layer, and removing a portion of said laminated sacrificial layers by etching to form a frame contact portion; forming a patterned frame layer on the frame contact portion and a portion of said second sacrificial layer; and removing said remaining sacrificial layers to form a frame and a shifting element capable of moving in said frame by electrostatic force applied externally.

Those micro light valves formed thus can be arranged in two-dimensional construction, and also driven by a driving method similar to that of the convention LCD device, to thereby embody a flat display device having a plurality of micro pixels.

The surface micro-machining technique means that structural layers and sacrificial layers are deposited on a substrate and the laminated layers are patterned and removed by etching methods to form a complicated micro-structure. Here, the sacrificial layers are the layers which are finally removed so as to independently isolate a body in motion from the other laminated layers.

BRIEF DESCRIPTION OF THE DRAWINGS

This invention may be better understood and its objects and advantages will become apparent to those skilled in the art by reference to the accompanying drawings as follows.

DESCRIPTION OF THE PREFERRED EMBODIMENTS

An embodiment according to the present invention will be described hereinafter with reference to FIGS. 1A to 1H.

Figure 1A:
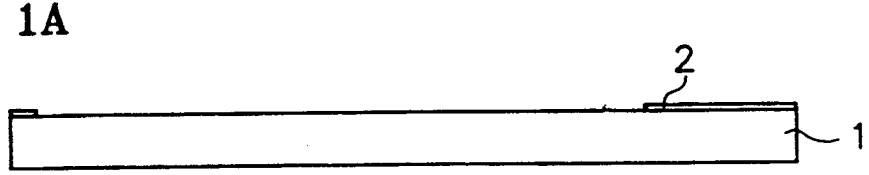
FIGS. 1A to 1H are cross-sectional views showing the steps for manufacturing a micro light valve to be used in a flat display device in accordance with an embodiment of the present invention.

Referring to FIG. 1A, an ITO (indium tin oxide) layer having 2000Å in thickness is formed on a glass substrate 1 by sputtering at a high temperature, and then on the ITO layer is deposited a photoresist (not shown). Next, the photoresist is patterned by a photolithography, as well-known in the semiconductor fabricating techniques, so as to define a transparent electrode as a data electrode 2. Also, a part of the ITO layer is removed by a wet etching method or a dry etching method, as well-known in the art, using the patterned photoresist as a data electrode forming mask, to thereby form the data electrode 2 having 30 μm in width, as shown in FIG. 1A.

Figure 1B:
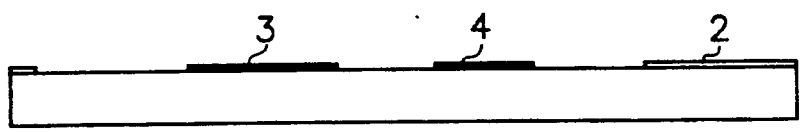

In FIG. 1B, on the substrate 1 is formed a chromium layer having the same as the thickness of the ITO layer by an electron beam deposition method. Subsequently, a patterned photoresist is formed on the chromium layer and then parts of the chromium layer are removed by etching to thereby form a selection electrode 3 having 30 μm in width and a common electrode 4 having 20 μm in width. Also, the electrodes on the substrate 1 are spaced with 20 μm in distance therebetween.

Figure 1C:
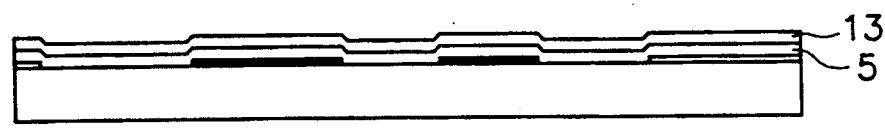

With respect to FIG. 1C, on the substrate formed thus is deposited a first insulating layer 5 having thickness of 5000Å by using an LPCVD (low pressure chemical deposition) method. Then, on the first insulating layer 5 is depositing a second insulating layer 13 having thickness of 5000Å by the LPCVD method. The first and second insulating layer 5 and 13 are made of nitride silicon, respectively.

Figure 1D:
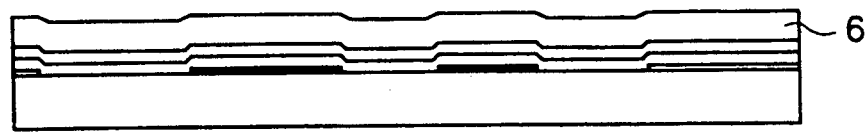

In FIG. 1D, by using the electron beam deposition method on the second insulating layer 13 is formed an aluminum layer having thickness of 3 $\mu$m to be used as a first sacrificial layer 6 of a light valve, which is completely formed by the following steps.

Figure 1E:
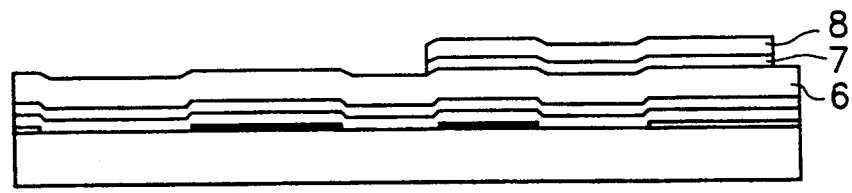

FIG. 1E shows the step for manufacturing a shifting element which serves as a resistance body of a light valve. As shown in FIG. 1E, on the first sacrificial layer 6 is deposited a nitride silicon layer 7 having 1 $\mu$m in thickness, and then on the nitride silicon layer 7 is deposited an amorphous silicon layer 8 having 2 $\mu$m in thickness. Subsequently, after forming of a patterned photoresist layer (not shown) on the amorphous silicon layer 8, the laminated nitride and amorphous silicon layers 7 and 8 are selectively removed in order by an RIE (reactive ion etching) method, using the patterned photoresist as a mask, and therefore a shifting element in a light valve is produced. In this embodiment, the amorphous silicon layer 8 is formed having a plate resistance of $10^9$–$10^{10}$ $\Omega/\square$, preferably.

Generally, an amorphous silicon can be deposited at a low temperature. Also, it can shut off a light beam with only a thickness of 2 $\mu$m, because it has a sufficient absorbance with respect to a visible ray.

Figure 1F:
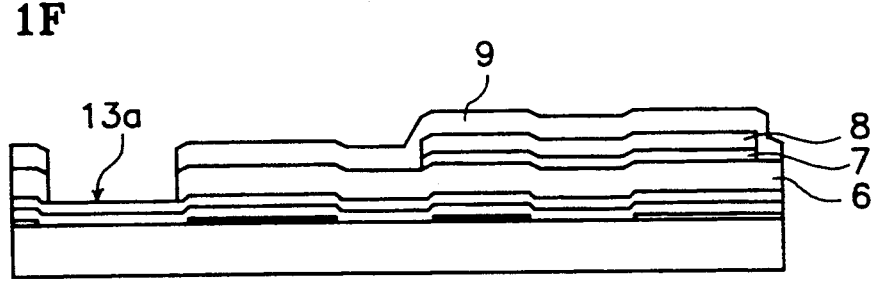

In FIG. 1F, an aluminum layer is deposited on the first sacrificial layer 6 and the shifting element by the electron beam deposition method to form a second sacrificial layer 9 having thickness of 2 $\mu$m. Next, on the second sacrificial layer 9 formed thus is deposited a patterned photoresist layer to thereby define a frame of the light valve. With the patterned photoresist layer as a mask, the sacrificial layers 6 and 9 are removed using pure $H_3PO_4$ solution at 60° C. to form a frame contact hole 13a.

Figure 1G:
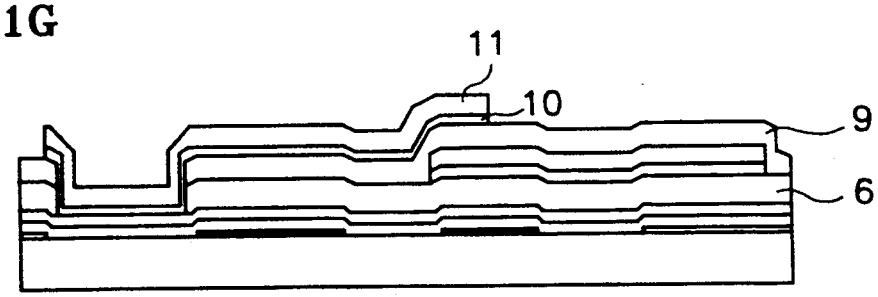

FIG. 1G shows a step for manufacturing a frame with a moving guider in which the shifting element is capable of moving therein. With respect to FIG. 1G, a nitride silicon layer 10 is filled in the frame contact hole 13a and deposited on the second sacrificial layer 9 by the LPCVD method. Also, on the nitride silicon layer 10 is deposited an amorphous silicon layer 11 having 3 $\mu$m in thickness. Subsequently, after formation of a patterned photoresist layer (not shown) on the amorphous layer 11, the laminated nitride and amorphous silicon layers 10 and 11 are removed-in order by the RIE method, using the patterned photoresist layer (not shown) as a frame forming mask. The frame formed thus functions as a movable guider for the shifting element, and also serves as the black matrix similar to that of a well-known liquid crystal display device.

Figure 1H:
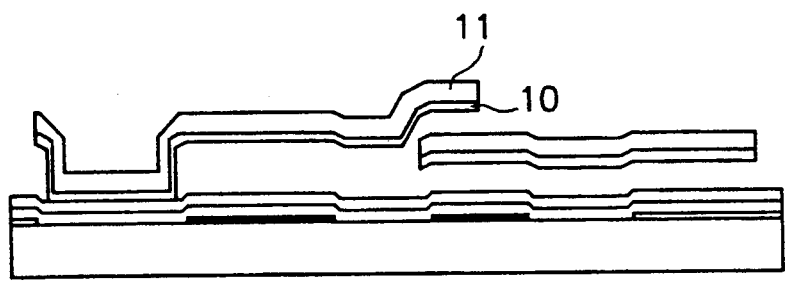

In addition, the first and second sacrificial layers 6 and 9 are simultaneously removed, as shown in FIG. 1H, so that the shifting element can be moved in the moving guider of the frame. Then, the etching solution for removing all the sacrificial layers 6 and 9 may use $H_3PO_4$ solution at 60°/C.

Another embodiment according to the present invention will be described hereinafter with reference to FIGS. 2A to 2H. In this embodiment, the steps for manufacturing the light valve in which selection and data electrodes are crossed from each other will described below. This embodiment of FIGS. 2A to 2J has the same method as that of the embodiment of FIGS. 1A to 1H except that a via hole is formed only on a data electrode by selectively etching an insulating layer on the data electrode.

Figure 2A:
FIGS. 2A to 2J are cross-sectional views showing the steps for manufacturing a micro light valve to be used in a flat display device in accordance with another embodiment of the present -invention.

Referring to FIG. 2A, an ITO (indium tin oxide) layer having 2000Å in thickness is formed on a glass substrate 1 by sputtering at a high temperature, and then on the ITO layer is deposited a photoresist (not shown). Next, the photoresist is patterned by a photolithography, as well-known in the semiconductor fabricating techniques, so as to define a transparent electrode as a data electrode 2. Also, a part of the ITO layer is removed by a wet etching method or a dry etching method, as well-known in the art, using the patterned photoresist as a data electrode forming mask, to thereby form the data electrode 2 having 30 $\mu$m in width, as shown in FIG. 2A.

Figure 2B:
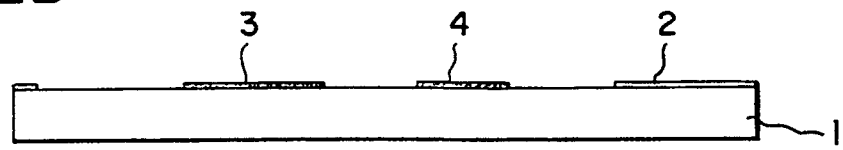

In FIG. 2B, on the substrate 2 is formed a first chromium layer having the same as the thickness of the ITO layer by an electron beam deposition method. Subsequently, a patterned photoresist is formed on the chromium layer and then parts of the first chromium layer are removed by etching to thereby form a selection electrode 3 having 30 $\mu$m in width and a common electrode 4 having 20 $\mu$m in width. Also, the electrodes on the substrate 2 are spaced with 20 $\mu$m in distance therebetween.

Figure 2C:
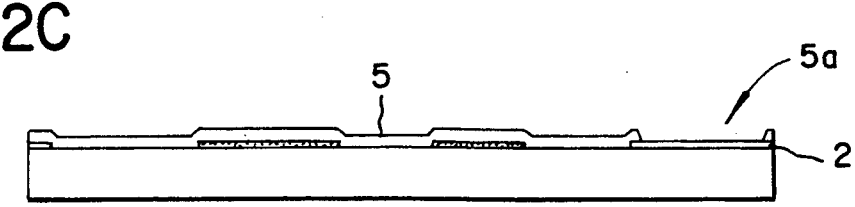
Figure 2D:
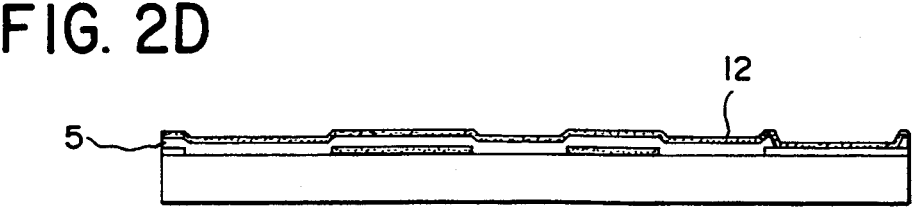

With respect to FIG. 2C, on the substrate formed thus is deposited a first insulating layer 5 having thickness of 5000Å by using a LPCVD (low pressure chemical deposition) method. Then, the first insulating layer 5 formed only on the data electrode 2 is selectively removed by a wet or dry etching method to form a via hole 5a. Next, on the first insulating layer 5 and the exposed data electrode 2 is deposited a second chromium layer 12, as shown in FIG. 2D.

Figure 2E:
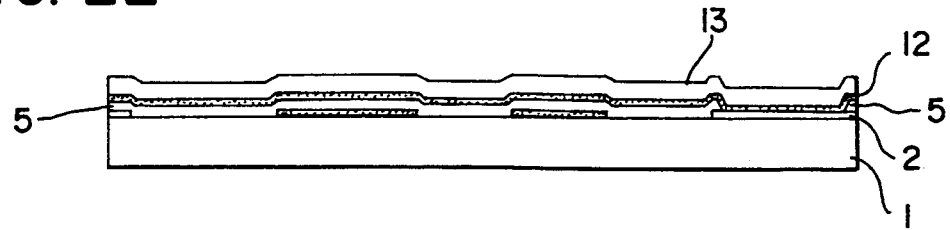

In FIG. 2E, on the second chromium layer 12 is formed a second insulating layer 13. The first and second insulating layer 5 and 13 are made of nitride silicon.

Figure 2F:
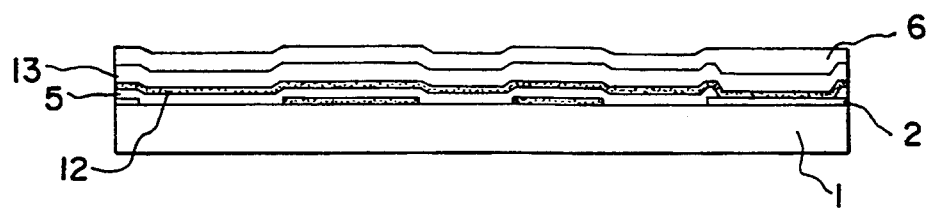

In FIG. 2F, by using the electron beam deposition method on the second insulating layer 13 is formed an aluminum layer having thickness of 3 $\mu$m to be used as a first sacrificial layer 6 of a light valve, which is completely formed by the following steps.

Figure 2G:
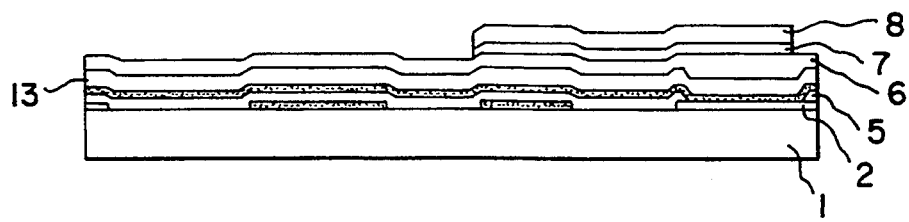

FIG. 2G shows the step for manufacturing a shifting element which serves as a resistance body of a light valve. As shown in FIG. 2G, on the first sacrificial layer 6 is deposited a nitride silicon layer 7 having 2 $\mu$m in thickness, and then on the nitride silicon layer 7 is deposited an amorphous silicon layer 8 having 2 $\mu$m in thickness. Subsequently, after forming of a patterned photoresist layer (not shown) on the amorphous silicon layer 8, the laminated nitride and amorphous silicon layers 7 and 8 are selectively removed in order by an RIE method, using the patterned photoresist as a mask, and therefore a shifting element in a light valve is produced. In this embodiment, the amorphous silicon layer 8 is formed having a plate resistance of $20^9$–$20^{20}\Omega/\square$, preferably.

Figure 2H:
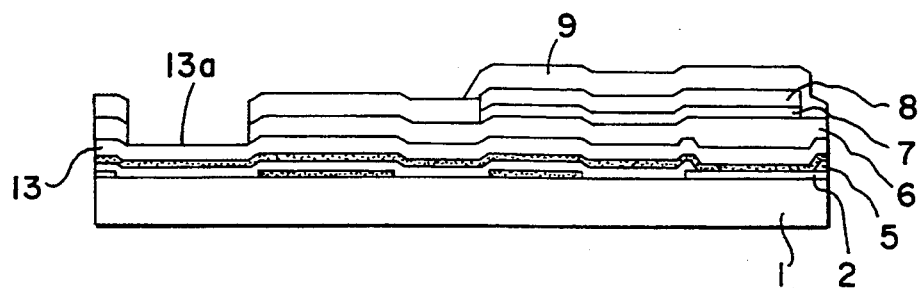

In FIG. 2H, an aluminum layer is deposited on the first sacrificial layer 6 and the shifting element by the electron beam deposition method to form a second sacrificial layer 9 having thickness of 2 $\mu$m. Next, on the second sacrificial layer 9 formed thus is deposited a patterned photoresist layer to thereby define a frame of the light valve. With the patterned photoresist layer as a mask, the sacrificial layers 6 and 9 are removed using pure H₃PO₄ solution at 60° C. to form a frame contact hole 13a.

Figure 2I:
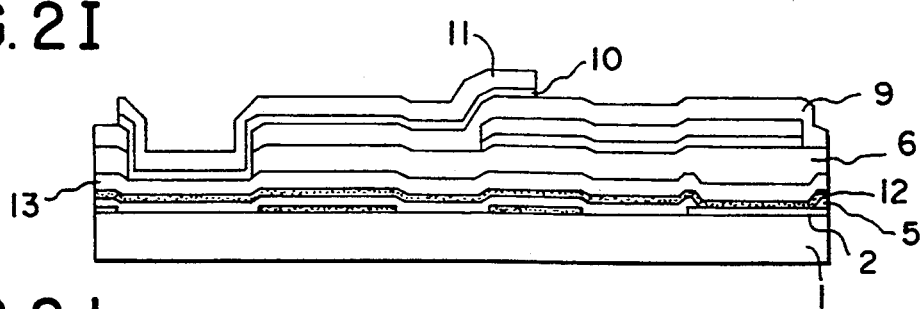

FIG. 2I shows a step for manufacturing a frame with a moving guider in which the shifting element is capable of moving therein. With respect to FIG. 2I, a nitride silicon layer 10 is filled in the frame contact hole 13a (FIG. 2H) and deposited on the second sacrificial layer 9 by the LPCVD method. Also, on the nitride silicon layer 10 is deposited an amorphous silicon layer 11 having 3 μm in thickness. Subsequently, after formation of a patterned photoresist layer (not shown) on the amorphous layer 11, the laminated nitride and amorphous silicon layers 10 and 11 are removed in order by the RIE method, using the patterned photoresist layer (not shown ) as a frame forming mask. The frame formed thus functions as a moving guider for the shifting element, and also serves as the black matrix similar to that of a well-known liquid crystal display device.

Figure 2J:
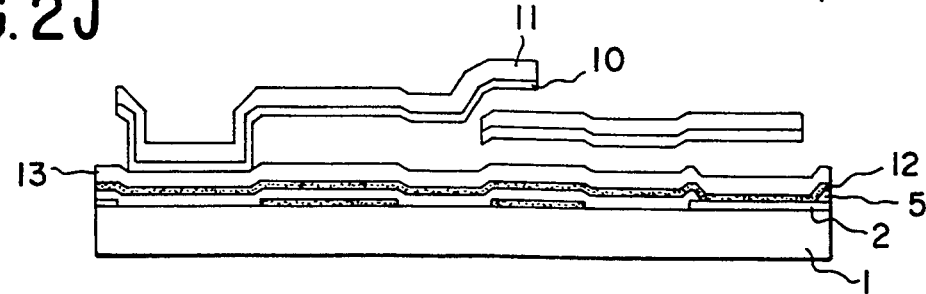

In addition, the first and second sacrificial layers 6 and 9 are simultaneously removed, as shown in FIG. 2J, so that the shifting element can be moved in the moving guider of the frame. Then, the etching solution for removing all the sacrificial layers 6 and 9 may use H₃PO₄ solution at 60° C.

Figure 3A:
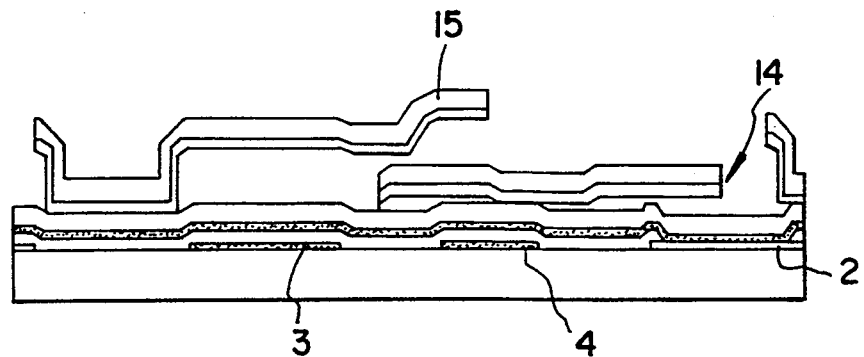
FIGS. 3A and 3B are cross-sectional and plane views showing construction of the micro light valve which is completely fabricated by the manufacturing method of the present invention, respectively.
Figure 3B:
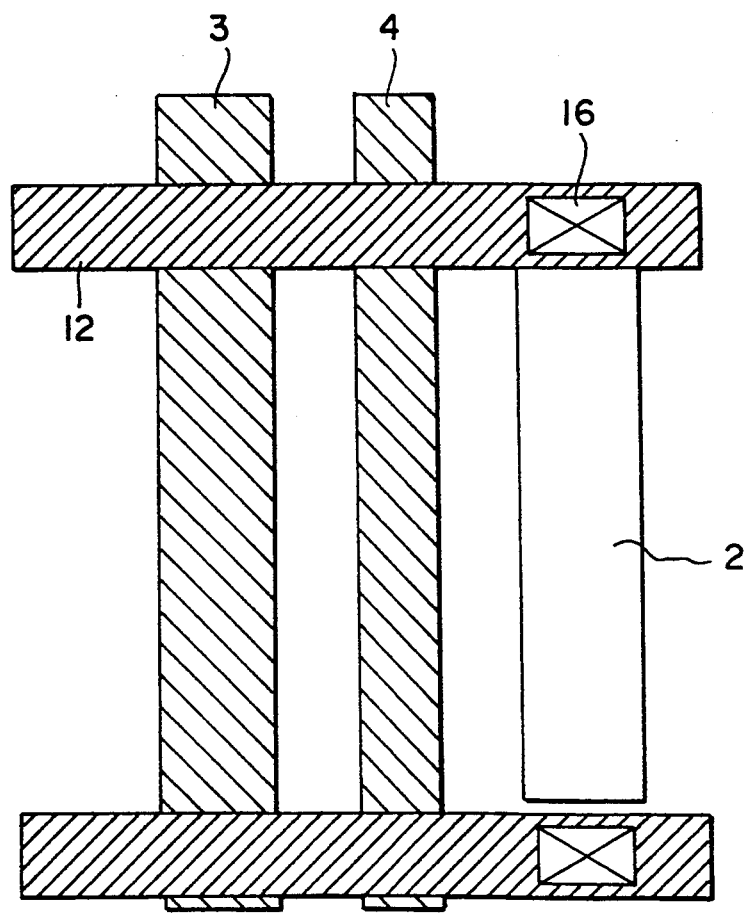

FIGS. 3A and 3B show the construction of the micro light valve which is manufactured by one embodiment of the present invention. In FIGS. 3A and 3B, reference numerals 14 and 15 represent a shifting element and a frame, respectively, and reference numeral 16 indicates a via for connecting the ITO electrode 2 and the chromium layer 12 which function as a data line.

Figure 3C:
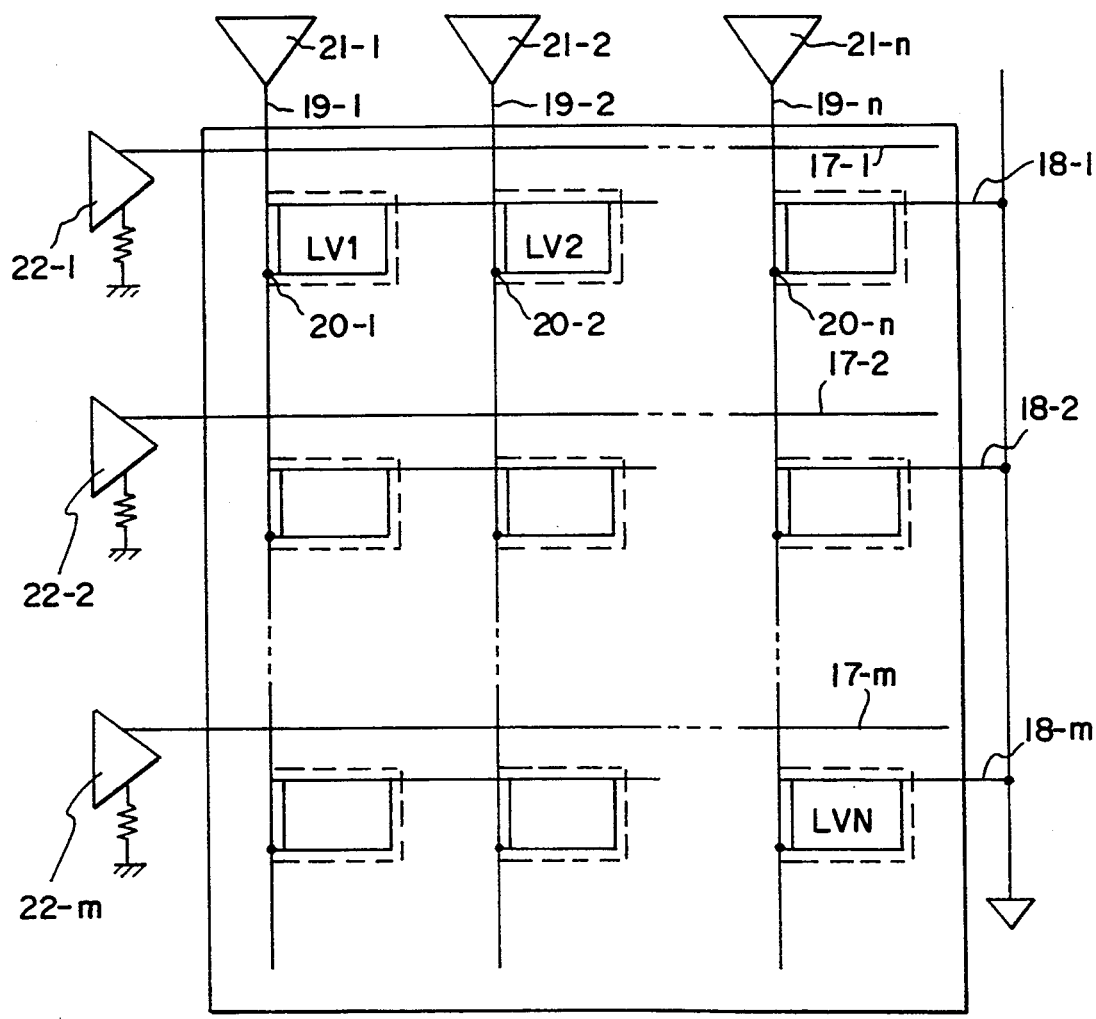
FIG. 3C is a circuit diagram showing a driving circuit for a flat display device in which the micro light valve of FIG. 3A is embodied.

When the micro light valve of FIG. 3A is used as an unit pixel for display, the flat display device may be embodied in m×n matrix by using a plurality of light valves LV, as shown in FIG. 3C. In FIG. 3C, reference numerals 17-1 to 17-m represent selection lines, reference numerals 18-1 to 18-m represent common lines, reference numerals 19-1 to 19-n represent data lines, reference numerals 20-1 to 20-n represent via contacts, reference numerals 21-1 to 21-n represent data line driving circuits, and reference numerals 22-1 to 22-m represent selection line driving circuits, respectively. As shown in FIG. 3C, a plurality of the light valves LV1 and LV2 to LVN are arranged in a two-dimensional m×n matrix.

The operating principle of the micro light valve will be described hereinafter with reference to the attached drawings.

Figure 4A:
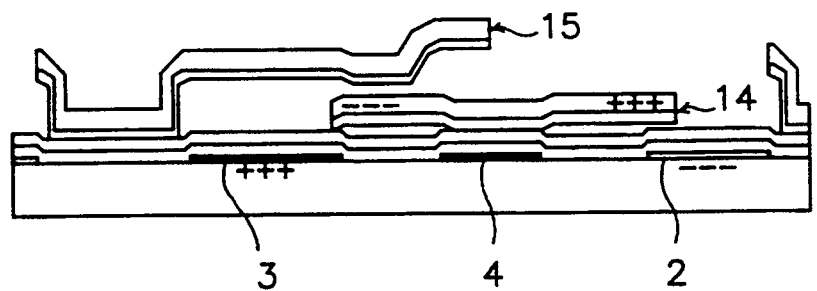
FIGS. 4A to 4C are schematic diagrams showing positions of a shifting element in the light valve, as shown in FIG. 3A, based on changes of polarity in each of electrodes.

As shown in FIG. 4A, if a voltage signal having positive polarity with respect to voltage of the common electrode 4, is applied to the selection electrode 3 and a voltage signal having negative polarity is applied to the data electrode 2, the shifting element 14 which is located under a predetermined position of the frame 15 is charged electrically to the opposite ends thereof, because the shifting element 14 serves as a resistance body in which charges can be moved therein. When the charged condition is reached to a state of equilibrium over a predetermined time, the positive polarity of the selection electrode 3 can be changed instantaneously to negative polarity in accordance with a change of the voltage signal to be applied sequentially to the selection lines 17-1 to 17-n.

Figure 4B:
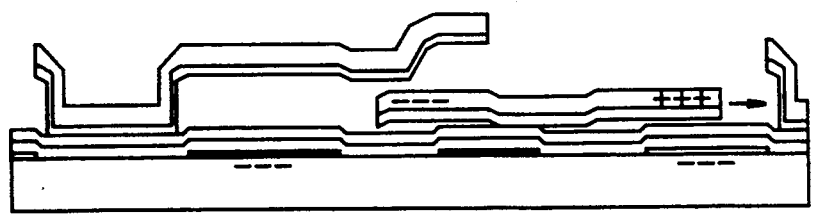
Figure 4C:
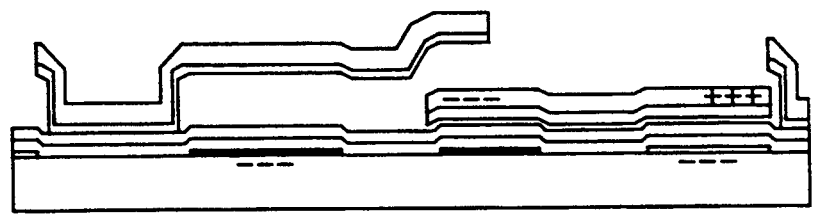

However, the shifting element 14 tends to be moved to the right as shown in FIG. 4B, because the polarity charged electrically in the shifting element 14 can be not changed in a moment therein due to interruption of charge flow by the internal resistance thereof. In this state, a repelling force is produced between the left portion of the shifting element 14 and the selection electrode 3 all having negative polarity, and a driving force is produced due to the repelling force so as to move the shifting element 14 to the right, the arrow direction as shown in FIG. 4B. As a result, the shifting element 14 can be moved to the right direction to change the light valve from the open state to the close state, as shown in FIG. 4C.

In the construction of this light valve, the time τ required for changing polarity of the shifting element 14 from positive polarity to negative polarity or negative polarity to positive polarity may be given by the following equation:

$$\tau = RC/2$$

where, R is a resistance of the shifting element and C is a capacitance of the capacitor formed by the shifting element and each of the electrodes. In the state of the light valve as shown in FIG. 4C, the capacitance is approximately $2 \times 10^{-14}$ F, and, when $R = 10^9 \Omega$, τ is about 10 μmsec.

Figure 5:
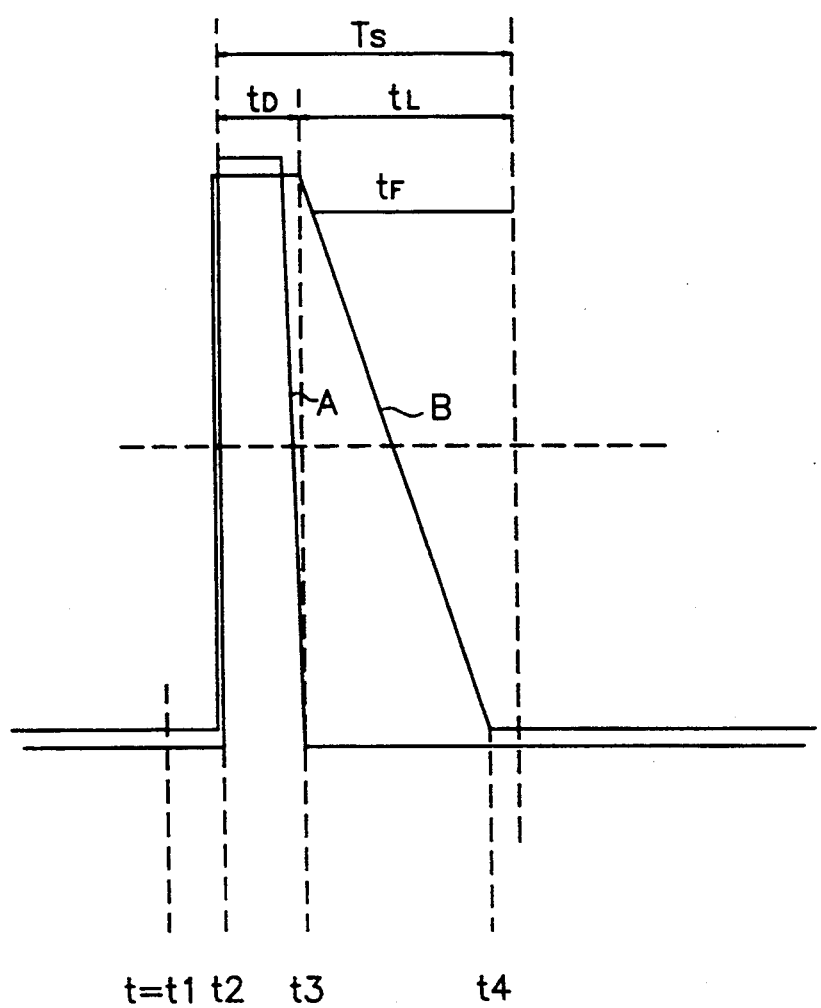
FIG. 5 is a waveform diagram of driving signals for changing position of the shifting element in the light valve, as shown in FIG. 3A.

In order to move the light valve from the close state to the open state, or from the open state to the close state, voltage signal having positive polarity has to be simultaneously applied to both of the selection electrode 3 and the data electrode 2, as shown in FIG. 5.

On the other hand, when the selection electrode 3 is at a positive signal, for example an ON signal, and a data signal to be applied the data electrode 2 maintains a negative voltage, or when the selection electrode 3 is at a negative signal, for example an OFF signal, without reference to level of the data signal, previous state of the light valve is maintained always. In detail, when both the selection and data electrodes 3 and 2 do not maintain an ON signal, the light valve is always to maintain the previous state.

In order to drive the light valve accurately, the following conditions are satisfied as follows:

1) Rising time of the driving signal has to be shorten sufficiently, and the time both of the data and selection electrodes are maintained at an ON signal has to be not longer than the charge relaxation time in the shifting element. That is, in FIGS. 5 and 6 $t_D$ has to satisfy condition of $t_D \tau$.

2) During one period of a data signal to be applied to the data electrode, the time the data signal is maintained at an OFF state has to be longer than the charge relaxation time. That is, in FIGS. 5 and 6 $t_L$ has to satisfy condition of $t_L > \tau$ in order to obtain stability of an initial condition, as shown in FIG. 7A.

3) Descending time of the signal to be applied to the selection line has to be nearly similar to the charge relaxation time. That is, $t_F$ has to satisfy condition of $t_F \geq \tau$.

Hereinafter, a driving method and driving states of the light valve based on driving signals will be described with reference to FIGS. 7 to 8.

FIGS. 7A to 7D show changes in position of the shifting element from a close state to an open state in accordance with timing of the driving signals, .as shown in FIG. 5.

In FIG. 7A, it is shown that a shifting element 14 is further apart from a frame is, that is, a close state or an initial state, when $t = t_1$ in FIG. 5.

Figure 7A:
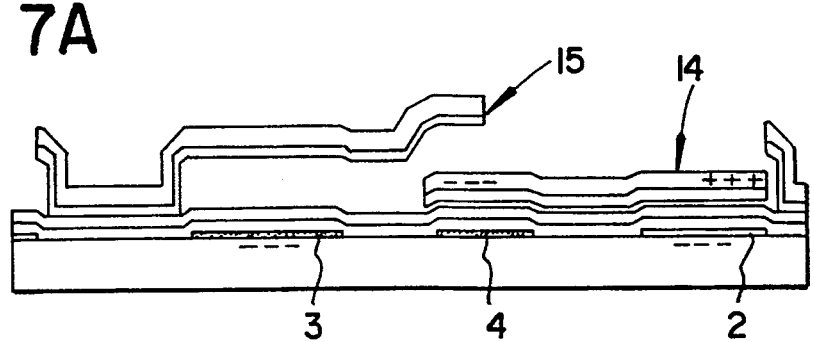
FIGS. 7A to 7D are schematic diagrams showing changes in position of the shifting element from a close state to an open state in accordance with timing of the driving signals, as shown in FIG. 5.
Figure 7B:
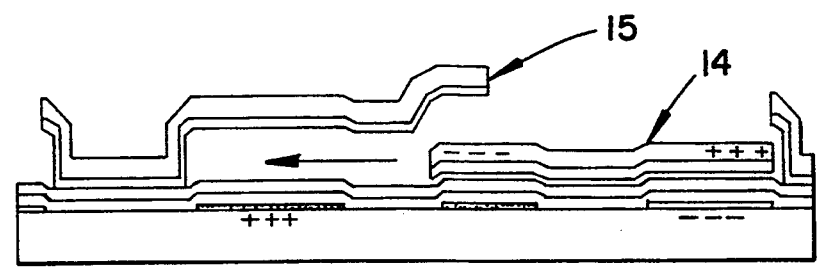

FIG. 7B shows that the shifting element 14 tends to be moved to the frame 15, when $t=t_2$ in FIG. 5. With respect to FIG. 7B, it is illustrated that polarity of the voltage to be applied to the data electrode 2 is changed instantaneously, but charge of the shifting element 14 which is charged by the data electrode 2 can not act on instantaneously. Accordingly, the shifting element 14 is positioned as shown in FIG. 7B. In this state, since the charges charged electrically in the shifting element 14 can be not moved in a moment due to interruption of charge flow by the internal resistance of the element 14, a repelling force is produced between the shifting element 14 and the data electrode 2, and a driving force is produced to move the shifting element 14 to the left direction, the arrow direction as shown in FIG. 7B. Accordingly, the shifting element 14 is moved to the left direction so that the light valve can be driven from the close state to the open state.

Also, in this state a frictional force between the shifting element in motion and the second insulating layer 13 can be largely reduced by the repelling force therebetween. Shifting of the shifting element in the light valve has to be performed completely within the relaxation time of charges. Then, the amount of the acceleration of the shifting element 14 caused by the electrostatic force is 1000 times faster than the acceleration of gravity.

Figure 7C:
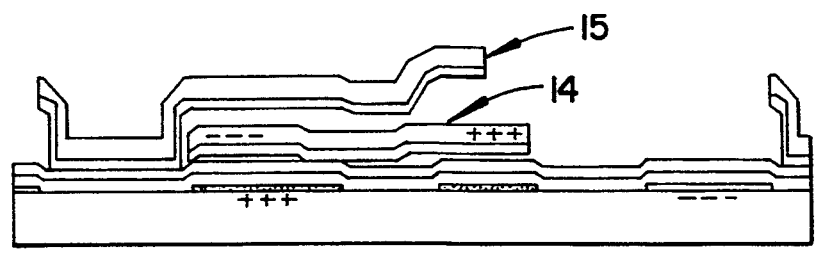

FIG. 7C shows that the shifting element 14 is inserted in the frame 15, when $t=t_3$ in FIG. 5. In this time, the data signal is changed to an OFF state again, but the shifting element 14 is completely inserted in the frame 15 due to attraction between the selection electrode charged to a negative polarity and the shifting element charged to a positive polarity.

Figure 7D:
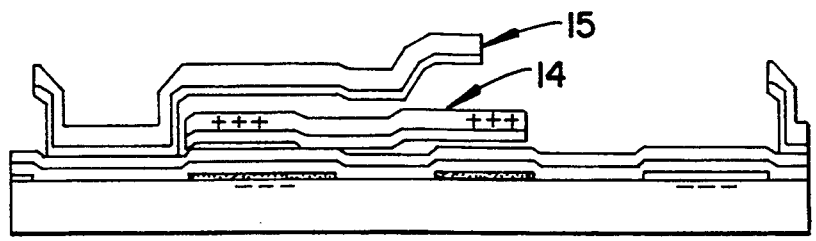

In FIG. 7D, the shifting element 14 is not moved and then redistribution of charges therein is performed, as a result state of equilibrium can be obtained from the charged state of the shifting element.

FIGS. 8A to 8D show changes in position of the shifting element from an open state to a close state in accordance with timing of the driving signals, as shown in FIG. 5.

Figure 8A:
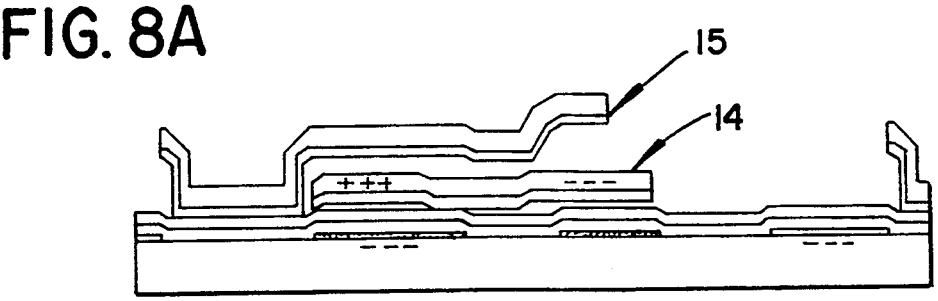
FIGS. 8A to 8D are schematic diagrams showing changes in position of the shifting element from an open state to a close state in accordance with timing of the driving signals, as shown in FIG. 5.

In FIG. 8A, it is shown that a shifting element 14 is completely inserted in a frame 15, that is, an open state or an initial state, when $t=t_1$ in FIG. 5. At the time the period $T_S$ of a signal is started, condition of the light valve is established as one of the initial states, as shown in FIGS. 7A and 8A.

Figure 8B:
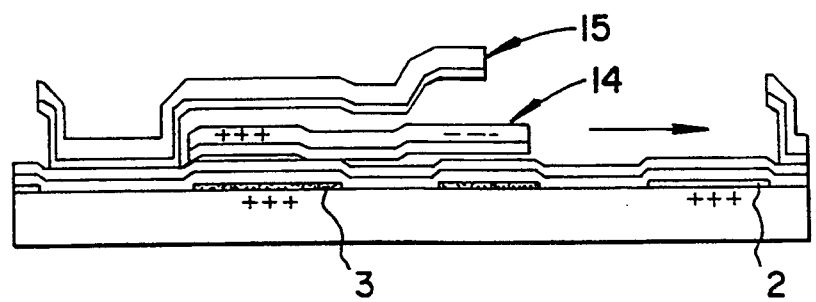

FIG. 8B shows that the shifting element 14 tends to be moved to the frame 15, when $t=t_2$ in FIG. 5. With respect to FIG. 8B, it is illustrated that the negative polarity of the voltage signal to be applied to each the data and selection electrodes 2 and 3 is changed instantaneously to positive polarity, but the shifting element 14 which is charged by the electrodes can not change instantaneously. This is because the shifting element is comprised of a resistance body. Accordingly, the shifting element 14 begins to move to the right direction as shown in FIG. 8B. In this state, since the charges charged electrically in the shifting element 14 can be not distributed in a moment due to interruption of charge flow by the internal resistance of the element 14, a repelling force is produced between the left portion of the shifting element 14 and the selection electrode 3, and an attraction force is produced between the left portion of the shifting element and the data electrode 2 so that the shifting element 14 can be moved towards the right as shown by the arrow in FIG. 8B.

Also, in this state a frictional force between the shifting element and the second insulating layer 13 can be largely lowered by the repelling force therebetween. Shifting of the shifting element in the light valve has to be performed completely within the relaxation time of the charges. The degree of the acceleration in the shifting element 14 caused by the electrostatic force is 1000 times faster than the acceleration of gravity.

Figure 8C:
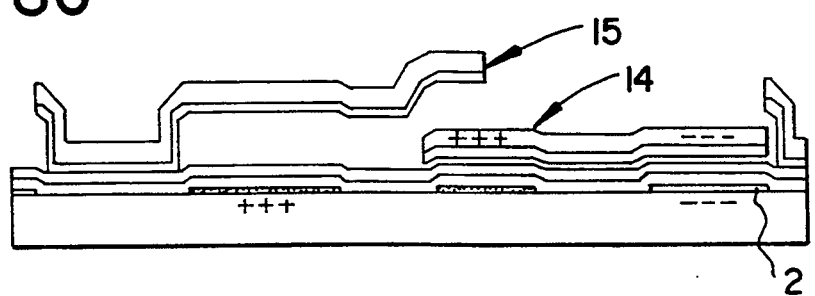

FIG. 8C shows that the shifting element 14 is completely moved from the frame 15 to the data electrode 2, when $t=t_3$ in FIG. 5. In this time, the data signal is changed to an OFF state again, but the shifting element 14 is completely shifted from the frame 15 due to the repelling force between the selection electrode charged to a positive polarity and the left portion of the shifting element charged to a positive polarity, so that the close state can be maintained in the light valve.

Figure 8D:
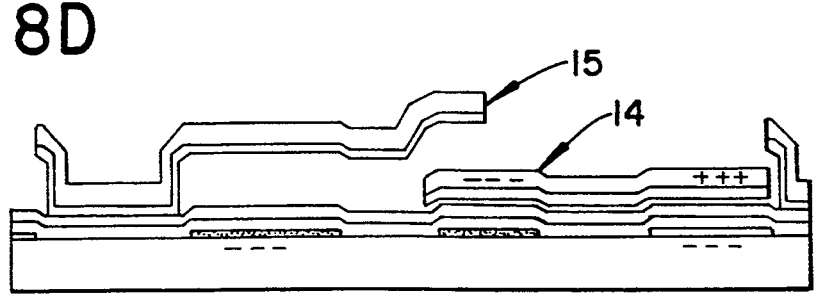

In FIG. 8D, the shifting element 14 is not moved and redistribution of charges therein is performed to change the charged state to the state of equilibrium between $t_3$ and $t_4$ in timing of the voltage signal to be applied to the selection electrode 4.

On the other hand, when the selection electrode 3 is at a positive signal, or an ON signal, and a data signal to be applied the data electrode 2 is an OFF state, or when the selection electrode 3 is at an OFF state without reference to level of the data signal, the previous state of the light valve is maintained.

FIGS. 9A to 9G show the charged states of the light valve which is maintained at a close state as an initial state.

Figure 6:
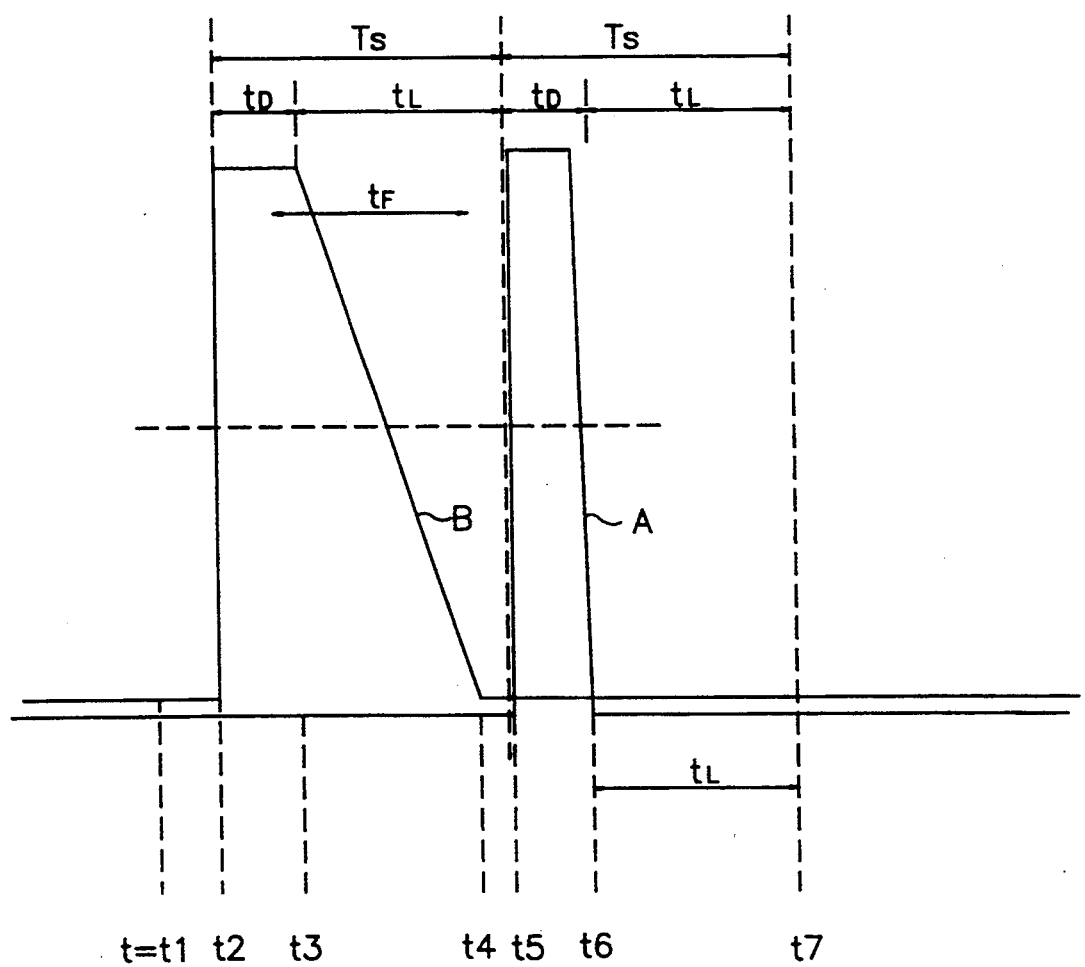
FIG. 6 is a waveform diagram of driving signals for holding previous state of the light valve.
Figure 9A:
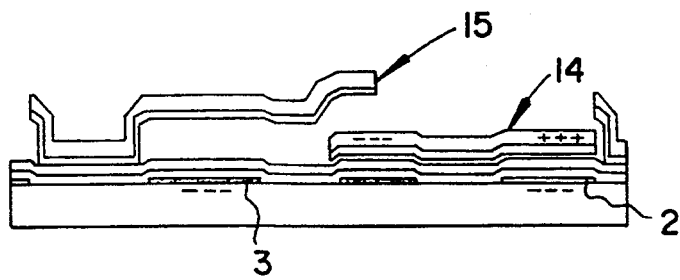
FIGS. 9A to 9G are schematic diagrams showing changes in position of the shifting element in accordance with timings of the driving signals, as shown in FIG. 6, in case of maintaining of the close state in the light valve.

In FIG. 9A, it is shown that a shifting element 14 is apart from a frame 15, that is, a close state or an initial state, when $t=t_1$ in FIG. 6. The condition of $t=t_1$ means that a negative voltage signal is applied to both selection electrode 3 and data electrode 2, as shown in FIG. 9A.

Figure 9B:
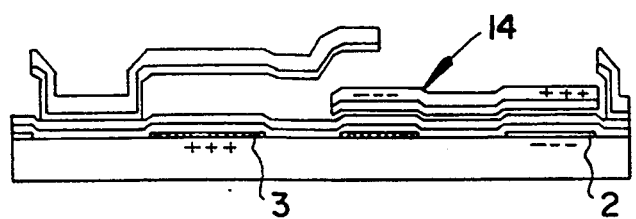

FIG. 9B shows the charged state of the light valve, when $t=t_2$ in FIG. 6. With respect to FIG. 9B, it is illustrated that the negative polarity of the selection electrode 3 is changed instantaneously to the positive polarity but the data electrode 2 remains charged with a negative polarity, and thus the shifting element 14 is positioned at the close state, as shown in FIG. 9B.

Figure 9C:
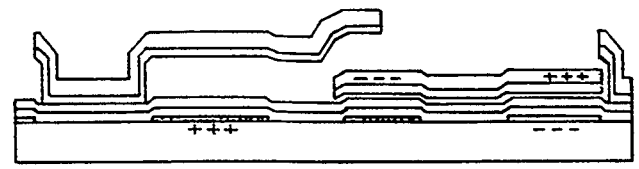
Figure 9D:
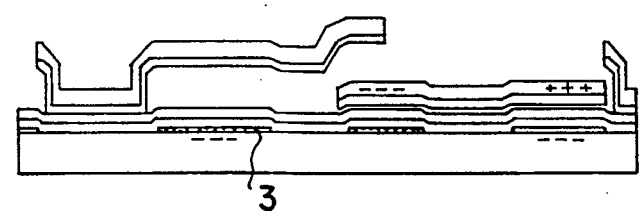

FIG. 9C shows that the previous state of the light valve is maintained continuously, when $t=t_3$ in FIG. 6. In FIG. 9D, it is shown that the positive polarity of the selection electrode 3 is changed again to the negative polarity, when $t=t_4$.

Figure 9E:
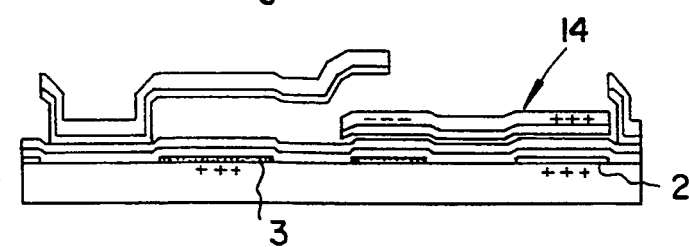

FIG. 9E shows that the polarity of the data electrode 2 is changed to the positive polarity, when $t=t_5$ in FIG. 6. Then, the data signal is at an ON state, but the selection electrode 3 is maintained at an OFF state, so that the shifting element 14 can not be moved therein.

Figure 9F:
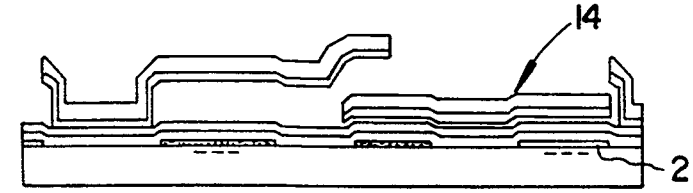

In FIG. 9F, it is illustrated that the polarity of the data electrode 2 is changed to the negative polarity, when $t=t_6$ in FIG. 6. Then, the charged state of the shifting element 14 is relaxed to the uniformly varying state, that is, the charges in the shifting element 14 tend to be distributed therein. Since the time $T_D$ the data signal is during an ON state is shorten, as compared to the charge relaxation time of the shifting element 14, and the data signal becomes an OFF state again without causing a sufficient distribution of the charges in the shifting element, the charged state of the light valve is set to the initial state, as in FIG. 9A.

Figure 9G:
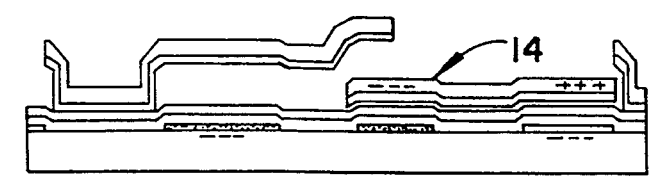

FIG. 9G shows that the charged state of the light valve is changed to the initial state as in FIG. 9A or FIG. 9D, when $t=t_7$ in FIG. 6. In this state, since $t_L$ is longer than τ during one period of the signal, the charges in the shifting element 14 can be relaxed sufficiently therein to form a state of equilibrium.

FIGS. 10A to 10G show the charged states of the light valve which is maintained at an open state as an initial state.

Figure 10A:
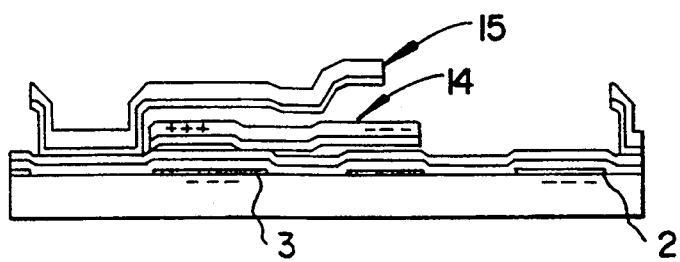
FIGS. 10A to 10G are schematic diagrams showing changes in position of the shifting element in accordance with timings of driving signals, as shown in FIG. 6, in case of maintaining of the open state in the light valve.

In FIG. 10A, it is shown that a shifting element 14 is inserted in a frame 15, that is, an open state or an initial state, when $t=t_1$ in FIG. 6. The condition of $t=t_1$ means when a negative voltage signal is applied to both of the selection and data electrodes 3 and 2, as shown in FIG. 10A.

Figure 10B:
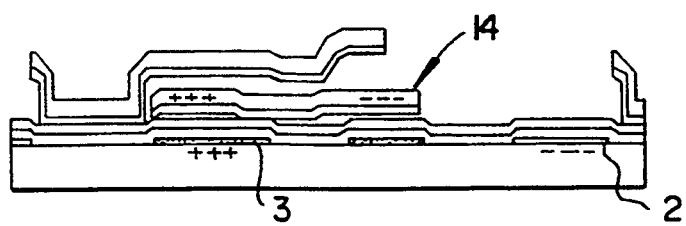

FIG. 10B shows the charged state of the light valve, when $t=t_2$ in FIG. 6. With respect to FIG. 10B, it is illustrated that the negative polarity charged previously in the selection electrode 3 is changed instantaneously to the positive polarity, but the data electrode 2 is maintained at the negative polarity, and thus the shifting element 14 is positioned in the open state, as shown in FIG. 10B. In this state, the signal to be applied to the selection electrode is change instantaneously to ON state to produce a repelling force between the shifting element and the selection electrode, but a repelling force is also produced between the shifting element and the data electrode so that the shifting element can not be moved to the right direction thereof.

Figure 10C:
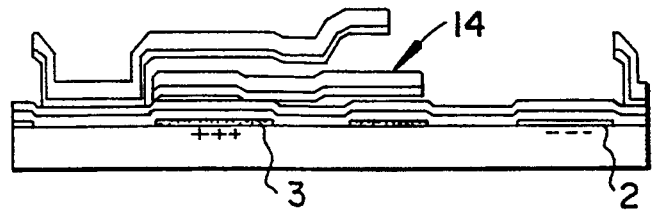

In FIG. 10C, it is shown that the electrodes 3 and 2 are maintained at previous state. Then, the charged state of the shifting element 14 is released to the uniformly varying state, that is, the charges in the shifting element 14 tend to be distributed during the time between $t_2$ and $t_3$ therein. Then, since time $t_D$ is more shorter than the charge relaxation time, charge distribution in the shifting element is not performed sufficiently.

Figure 10D:
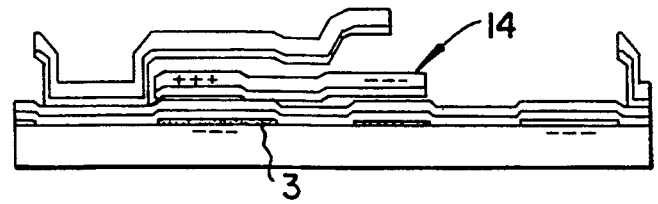

With respect of FIG. 10D, it is shown that the previous polarity of the selection electrode 3 is changed again to the negative polarity and the shifting element 14 is charged to both of the ends thereof, when $t=t_4$, as in the initial state of FIG. 10A.

Figure 10E:
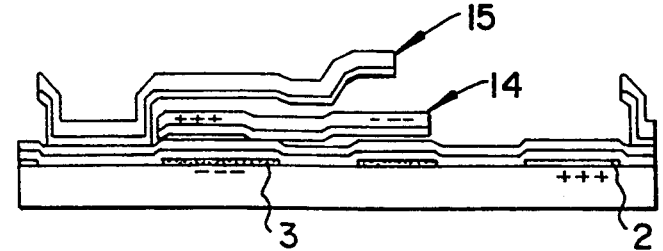

FIG. 10E shows that the negative polarity of the data electrode 2 is changed to the positive polarity, when $t=t_5$ in FIG. 6. Then, the data signal to be applied the data electrode 2 is an ON state, but the selection electrode 3 is maintained at an OFF state, so that the shifting element 14 can not be shifted from the frame 15 to the right direction. In this state, any polarity change of the data signal is not effected in moving of the shifting element.

Figure 10F:
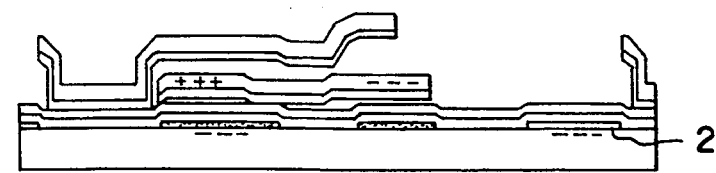

In FIG. 10F, it is illustrated that the positive polarity of the data electrode 2 is changed to the negative polarity, when $t=t_6$ in FIG. 6. As is the case with the state of FIG. 10E, also in this state, the shifting element is not effected to be maintained at the previous state.

Figure 10G:
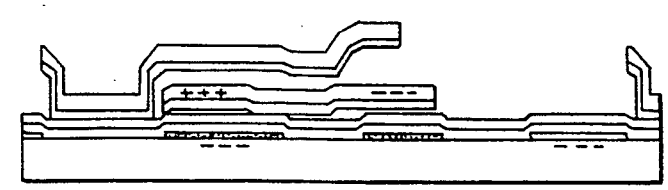

FIG. 10G shows that the charged state of the light valve is changed to the initial state as in FIG. 10A or FIG. 10D, when $t=t_7$ in FIG. 6.

As described above, the present invention is provided for a flat display device in which a shifting element, in the light valve as is manufactured by the surface micromachining method, can be shifted by electrostatic force to pass or shut a light source.

Accordingly, the flat display device of the present invention can be manufactured using the conventional semiconductor fabrication method only. Also, to manufacture the flat display device, it is not necessary to utilize several complicated-processes, such as space arrangement between two substrates having a liquid crystal layer therebetween, orientation film forming process for arrangement of liquid crystal, or the like, as compared with several types of liquid crystal display devices as the conventional display devices, so that the flat display device having high pixel density can be manufactured easily.

Furthermore, the flat display device of the present invention has a good display quality as well as a good light transmissivity, because the device is not embodied of liquid crystal as an intermediation material. In addition, with the driving method of the flay display device, moving image as well as stationary images can be displayed.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A flat display device having a plurality of micro light valves which correspond to respective pixels for display, said device comprising:

a plurality of selection lines and data lines disposed in a matrix;

said micro light valves each comprising a data electrode to be connected with a corresponding on of the data lines through a via, a selection electrode to be connected with a corresponding on of the selection lines, a common electrode formed between the selection and data electrodes, a frame, and a shifting element capable of being moved in the frame by driving signals to be applied to the data and selection electrodes, so as to pass or shut off a light beam;

a first driving means connected to the respective selection lines, for supplying a selection signal for said light valves; and a second driving means connected to the respective data lines, for supplying a data signal for said light valve.

2. A method for manufacturing a flat display device having a plurality of pixels and a plurality of micro light valves, one of said micro light valves corresponding to one of said pixels thereof, said method comprising the steps of:

preparing a semiconductor substrate with a main surface;

forming electrodes to be used as a data electrode, a selection electrode, and a common electrode on said substrate in parallel;

depositing an insulating layer on said substrate formed thus;

forming a first sacrificial layer on said insulating layer;

forming a patterned shifting element layer on said first sacrificial layer;

forming a second sacrificial layer on said substrate which is provided with said shifting element layer, and removing a portion of said sacrificial layers by etching to form a frame contact portion;

forming a patterned frame layer on the frame contact portion and a portion of said second sacrificial layer; and removing said remaining sacrificial layers to form a frame and a shifting element capable of moving in said frame by electrostatic force applied externally.

3. The method according to claim 2, wherein said substrate is made of glass.

4. The method according to claim 2, wherein the step for forming said electrodes comprises the steps of forming said transparent layer on said substrate; and forming a patterned chromium layer on said substrate to form the selection and common electrodes in parallel.

5. The method according to 4, wherein said transparent is made of an ITO film, and each of said selection and common electrodes is made of chromium.

6. The method according to claim 2, wherein the step for forming said insulating layer is performed by depositing of nitride silicon twice.

7. The method according to claim 2, wherein each of said sacrificial layers is made of aluminum.

8. The method according to claim 2, wherein said shifting element layer is formed of a laminated nitride silicon layer and an amorphous silicon layer.

9. The method according to claim 2, wherein said frame layer is formed of a laminated nitride silicon layer and an amorphous silicon layer.

10. A method for manufacturing a flat display device having a plurality of pixels and a plurality of micro light valves, one of said micro light valves corresponding to one of said pixels thereof, said method comprising the steps of:
preparing a semiconductor substrate with a main surface;
forming electrodes to be used as a data electrode, a selection electrode, and a common electrode on said substrate in parallel;
depositing an first insulating layer on said substrate formed thus, and forming a via hole only on said transparent layer;
forming a chromium layer on said insulating layer and said via hole, and depositing a second insulating layer on said chromium layer;
forming a first sacrificial layer on said second insulating layer;
forming a patterned shifting element layer on said first sacrificial layer;
forming a second sacrificial layer on said substrate which is provided with said shifting element layer, and removing a portion of said laminated sacrificial layers by etching to form a frame contact portion;
forming a patterned frame layer on the frame contact portion and a portion of said second sacrificial layer; and
removing said remaining sacrificial layers to form a frame and a shifting element capable of moving in said frame by electrostatic force applied externally.

11. The method according to claim 10, wherein said substrate is made of glass.

12. The method according to claim 10, wherein the step for forming said electrodes comprises the steps of forming said transparent layer on said substrate; and forming a patterned chromium layer on said substrate to form the selection and common electrodes in parallel.

13. The method according to 12, wherein said transparent is made of an ITO film, and each of said selection and common electrodes is made of chromium.

14. The method according to claim 10, wherein the step for forming said insulating layer is performed by depositing of nitride silicon twice.

15. The method according to claim 10, wherein each of said sacrificial layers is made of aluminum.

16. The method according to claim 10, wherein said shifting element layer is formed of a laminated nitride silicon layer and an amorphous silicon layer.

17. The method according to claim 10, wherein said frame layer is formed of a laminated nitride silicon layer and an amorphous silicon layer.

* * * * *